(No Model.)
J. S. GOCHNAUER.
HORSE HAY FORK.
No. 298,574. Patented May 13, 1884.
Fig. 1.
Fig. 2.
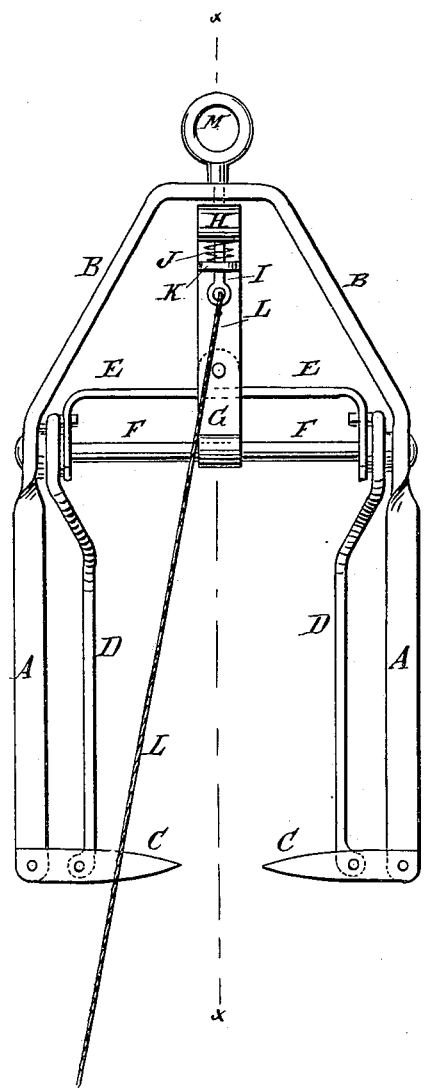
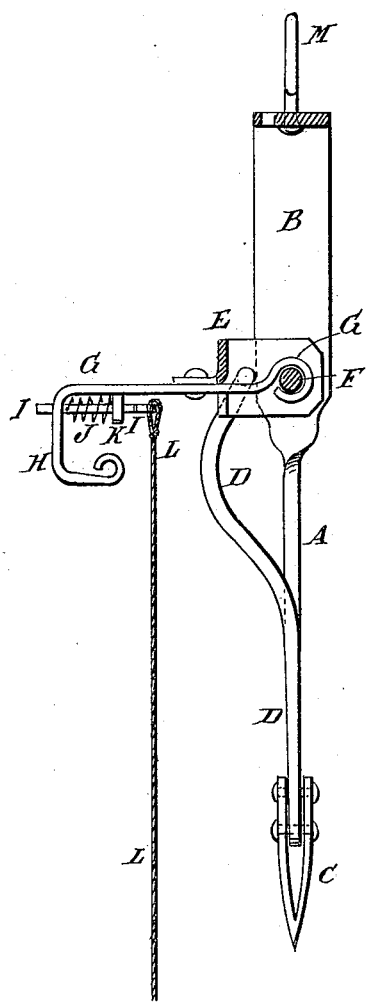
WITNESSES:
Chas. Nida
C. Sedgwick
INVENTOR:
J. S. Gochnauer
BY Munn & Co.
ATTORNEYS.

UNITED STATES PATENT OFFICE.

JOSEPH SEIFERT GOCHNAUER, OF ABBOTTSTOWN, PENNSYLVANIA.

HORSE HAY-FORK.

SPECIFICATION forming part of Letters Patent No. 298,574, dated May 13, 1884.

Application filed September 25, 1883. (No model.)

*To all whom it may concern:*

Be it known that I, JOSEPH SEIFERT GOCHNAUER, of Abbottstown, in the county of Adams and State of Pennsylvania, have invented a new and useful Improvement in Horse Hay-Forks, of which the following is a full, clear, and exact description.

Reference is to be had to the accompanying drawings, forming a part of this specification, in which similar letters of reference indicate corresponding parts in all the figures.

Figure 1 is a front elevation of my improvement, shown in position for raising and carrying the hay. Fig. 2 is a vertical cross-section of the same on the line $x\ x$, Fig. 1, showing the fork in position for discharging the hay.

The object of this invention is to improve the construction of the horse hay-forks for which Letters Patent Nos. 72,286 and 86,831 were granted December 17, 1867, and February 9, 1869, respectively, in such a manner as to make them more convenient in use and more reliable in operation.

The invention consists of the detailed construction and combination of parts, substantially as hereinafter fully set forth and claimed.

A are the side bars, which are connected at their upper ends by a bent bar, B. The bars A and B may be formed in one piece, if desired.

To the lower ends of the bars A are hinged the tines or shoes C, which, when turned down, serve as points to the said bars, and when turned up serve to support the hay while being raised and carried.

To the tines C, at a little distance from their hinged ends, are pivoted the lower ends of two connecting-rods, D, the upper ends of which are pivoted to the bent or U-shaped lever E at a little distance from its pivoted ends. The ends of the bent lever E have holes formed through them to receive and turn upon the rod F, the ends of which are attached to the upper ends of the side bars, A.

To the center of the bent lever E is rigidly attached a lever, G, the lower end of which has an eye formed in it to receive and turn upon the center of the stationary rod F. The upper part of the lever G extends up to the upper part of the bent bar B when the tines are raised, and is there bent outward to form a handle, H.

In the bent upper part of the lever G is formed a hole for the passage of the pin or bolt I, the outer end of which engages with a hole formed in the upper part of the bent bar B.

Upon the bolt I is placed a spiral spring, J, the outer end of which is attached to said bolt, or bears against a collar attached to the bolt.

The inner end of the spring J rests against a lug, K, attached to the lever G a short distance from its bend.

The bolt I passes through a hole in the lug K, and has an eye formed in its inner end, in which is secured the upper end of the trip-cord L.

To the center of the bent bar B is swiveled an eyebolt, M, to receive the end of a hoisting-rope.

With this construction, when the various parts of the fork are in the position shown in Fig. 2, and the tines have been thrust into the hay, the lever G is swung upward, which causes the tines C to take the position shown in Fig. 1, to support the hay, and causes the spring-bolt I to engage with the bar B, and lock the various parts of the fork in the position shown in Fig. 1.

When the hay has been carried to the desired place of delivery, the trip-cord L is pulled upon, which withdraws the spring-bolt I from the bar B, and allows the hay to force the tines C and the other parts of the fork into the position shown in Fig. 2, and then slide off the tines, leaving the parts of the fork in position to have its tines again forced into the hay.

Having thus fully described my invention, I claim as new and desire to secure by Letters Patent—

In a horse hay-fork, the combination, with the connected side bars, A, provided with the hinged tines C and the rod F, of the lever-frame E, pivoted upon the connecting-rod F, the connecting-rods D, pivoted to the tines and to the lever-frame E at one side of the pivotal point of said frame, the lever G, fastened to the frame E and pivoted upon the
5 connecting-rod F, the upper end of said lever G having a spring-bolt adapted to engage with the upper connection of the side bars, and means for tripping or withdrawing said bolt, substantially as and for the purpose set forth.

JOSEPH SEIFERT GOCHNAUER.

Witnesses:
MICHEAL SHAFFER,
GEORGE ERNIG.